United States Patent
Perazzo et al.

(10) Patent No.: US 11,258,735 B2
(45) Date of Patent: Feb. 22, 2022

(54) INTELLIGENT, TRACKABLE, AND ACTIONABLE CONVERSATIONAL SYSTEMS AND METHODS

(71) Applicant: Companyons, Inc., San Francisco, CA (US)

(72) Inventors: Paolo Perazzo, San Francisco, CA (US); Navin Goel, San Francisco, CA (US)

(73) Assignee: Companyons, Inc., San Francisco, CA (US)

( * ) Notice: Subject to any disclaimer, the term of this patent is extended or adjusted under 35 U.S.C. 154(b) by 231 days.

(21) Appl. No.: 16/438,523

(22) Filed: Jun. 12, 2019

(65) Prior Publication Data
US 2020/0396184 A1 Dec. 17, 2020

(51) Int. Cl.
*G06Q 10/10* (2012.01)
*H04L 51/046* (2022.01)
*G06F 3/0482* (2013.01)
*H04L 67/00* (2022.01)
*H04L 51/00* (2022.01)
*G06F 40/279* (2020.01)

(52) U.S. Cl.
CPC .......... *H04L 51/046* (2013.01); *G06F 3/0482* (2013.01); *G06F 40/279* (2020.01); *G06Q 10/10* (2013.01); *H04L 51/16* (2013.01); *H04L 67/34* (2013.01)

(58) Field of Classification Search
CPC ....... H04L 51/046; H04L 51/16; H04L 67/34; G06F 40/279; G06F 40/30; G06F 3/0482; G06Q 10/10
See application file for complete search history.

(56) References Cited

U.S. PATENT DOCUMENTS

| | | | | |
|---|---|---|---|---|
| 7,593,992 | B2 * | 9/2009 | Wodtke | G06Q 10/107 |
| | | | | 709/206 |
| 10,375,224 | B2 * | 8/2019 | Kim | H04L 51/36 |
| 10,574,600 | B1 * | 2/2020 | Chiarella | H04L 51/043 |
| 10,877,961 | B1 * | 12/2020 | Richman | H04L 67/306 |

(Continued)

*Primary Examiner* — Alvin H Tan
(74) *Attorney, Agent, or Firm* — Clements Bernard Baratta; Lawrence A. Baratta, Jr.; Jacob P. Beers (57) ABSTRACT

Intelligent, trackable, and actionable conversational systems and methods identify specific items in a stream of messages representing conversational primitives as described below and organize them in a structured and actionable form (referenced as Conversational Primitives Dashboard below), further triggering automated workflows. Advantageously, the structured and actionable form improves collaboration providing a layer of productivity to augment messaging. A method includes, subsequent to identification of messages matching a plurality of conversational primitives, analyzing messages in a conversational service to identify the messages matching any of the conversational primitives; responsive to identifying the messages, converting each of the messages into an associated structured form, wherein each message is identified as a specific conversational primitive of the plurality of conversational primitives and the associated structured form is based on the specific conversation primitive; and maintaining all of the messages in their associated structured form.

16 Claims, 9 Drawing Sheets

(56) References Cited

U.S. PATENT DOCUMENTS

| | | | |
|---|---|---|---|
| 2005/0228774 A1* | 10/2005 | Ronnewinkel | G06F 16/353 |
| 2014/0006972 A1* | 1/2014 | Celkonas | G06Q 10/107 |
| | | | 715/753 |
| 2017/0161372 A1* | 6/2017 | Fern ndez | G06F 40/268 |
| 2019/0332669 A1* | 10/2019 | Lewis | G06F 16/3344 |

* cited by examiner

Action

- Requires multi-step adoption process
    1. What is a message action?
    2. How to trigger it?
    3. Which app with the needed action to install?
    4. How to search for the action amongst others already installed?

- Expects user to identify actionable messages and remember to apply action

Hint

- Removes dependency from user

- Contextually surfaces the appropriate Slack/Apps capability

- Helps app discoverability

- Makes Slack a powerful team "assistant"

INTELLIGENT, TRACKABLE, AND ACTIONABLE CONVERSATIONAL SYSTEMS AND METHODS

FIELD OF THE DISCLOSURE

The present disclosure generally relates to computer and networking systems and methods. More particularly, the present disclosure relates to intelligent, trackable, and actionable conversational systems and methods.

BACKGROUND OF THE DISCLOSURE

Computing devices and associated applications are proliferating. As an example, various types of conversational services (that operate on corresponding systems or platforms) are proliferating allowing multiple users to communicate together for various purposes. Non-limiting examples of such platforms include Slack, Microsoft Teams, Google Hangouts, Cisco WebEx Teams, Facebook, Facebook Messenger, Twitter, Snapchat, Instagram, WhatsApp, Amazon Alexa, Google Assistant, Siri from Apple, etc. In the context of conversational services, these platforms are designed such that users communicate to each other or to the "virtual assistant" to complete some task, common or personal. This could be in the work environment. However, social media platforms are collaborative as well as offering tasks such as scheduling parties, get-togethers, events, getting things done together, etc.

Unfortunately, while these conversational services enhance collaboration, there is information overload. Messages are difficult to track, unstructured, and not actionable. Today, to solve this problem, users need to manually re-enter the content of those messages in dedicated and separated apps (e.g., productivity apps), which adds extra effort and simply may not occur. There is a need for automation and organization and an ability to make the messages actionable.

BRIEF SUMMARY OF THE DISCLOSURE

In an embodiment, a non-transitory computer-readable storage medium has computer readable code stored thereon for programming a processor to perform the steps of, subsequent to identification of messages matching a plurality of conversational primitives, analyzing messages in a conversational service to identify the messages matching any of the conversational primitives; responsive to identifying the messages, converting each of the messages into an associated structured form, wherein each message is identified as a specific conversational primitive of the plurality of conversational primitives and the associated structured form is based on the specific conversation primitive; and maintaining all of the messages in their associated structured form. The computer readable code can be further configured for programming the processor to perform the steps of utilizing the associated structured form to trigger one or more workflows. The identification can include labeling data for each of the plurality of conversational primitives to train a Natural Language Processing model for the analyzing.

The computer readable code can be further configured for programming the processor to perform the steps of providing a dashboard that includes all of the identified messages in their structured form for management; and providing associated messages that originated a selected structured form responsive to selections in the dashboard. The computer readable code can be further configured for programming the processor to perform the steps of providing a hint to a user responsive to identifying messages matching a conversational primitive; and converting the identified messages to the associated structured form based on the user selecting the hint. The hint can include a plurality of options to generate the associated structured form in a plurality of applications including the conversational service.

Each conversational primitive can include any of a task, a meeting or event, a question, a poll, a survey, an answer, a praise, a celebration, an announcement, an important message, a labeled message, a recurring message, an approval request, a review request, a conflict, and a feedback. At least one of the plurality of conversational primitives can have no associated action and is used to track an event in the messages. At least one of the plurality of conversational primitives can be used to track an event in the messages, and wherein the event is utilized for tracking. The computer readable code can be further configured for programming the processor to perform the steps of importing, from an external application and via an Application Programming Interface, a structured form created to match one of the plurality of conversational primitives, wherein the structured form is utilized to add to the maintaining. The computer readable code can be further configured for programming the processor to perform the steps of providing, to an external application and via an Application Programming Interface, a notification responsive to identifying the messages.

In another embodiment, a computer-implemented method includes, subsequent to identification of messages matching a plurality of conversational primitives, analyzing messages in a conversational service to identify the messages matching any of the conversational primitives; responsive to identifying the messages, converting each of the messages into an associated structured form, wherein each message is identified as a specific conversational primitive of the plurality of conversational primitives and the associated structured form is based on the specific conversation primitive; and maintaining all of the messages in their associated structured form.

In a further embodiment, a server includes a network interface communicatively coupled to a network; a processor communicatively coupled to the network interface and the location determination device; and memory storing instructions that, when executed, cause the processor to, subsequent to identification of messages matching a plurality of conversational primitives, analyze messages in a conversational service to identify the messages matching any of the conversational primitives; responsive to identification of the messages, convert each of the messages into an associated structured form, wherein each message is identified as a specific conversational primitive of the plurality of conversational primitives and the associated structured form is based on the specific conversation primitive; and maintain all of the messages in their associated structured form.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to intelligent, trackable, and actionable conversational systems and methods. The disclosure provides a process to identify specific messages in a stream of messages representing conversational primitives as described below and organize them in a structured and actionable form (referenced as a Conversational Primitives Dashboard below), further triggering automated workflows. Advantageously, the structured and actionable form for the identified messages improves collaboration providing a layer of productivity to augment messaging. For example, a message that includes "Paolo, can you send the contract by tomorrow at 5 PM" is a) turned into a structured task with assignee, task name, due date b) organized and made actionable with primitive's actions (complete, assign, comment, delete) by the UI internal to the conversational system c) triggers workflows such as reminders at 5 PM.

As described herein, data that is analyzed can be a message and associated, optional attachments via a conversational service, i.e., messaging, email, voice, etc. The triggering message could be sent in a chat app, in an email app or any computer system that can receive and transmit messages. The message could be in digital (text) or analog (voice, which is converted into text). Also, Primitive Events Application Programming Interfaces (APIs) can provide alerts when certain types of messages are sent on the conversational service. A developer can also use Primitive-oriented APIs for low complexity integration to the conversation service. As an example, a project management application interested in developing a companion application on a conversational system could simply call the Primitive-oriented API when a task is created on their original application (e.g., on Desktop). From there, a sequence of steps would be triggered on the conversational system, e.g., send a message to a channel announcing the task creation, add the task to the associated list as described in Actionable Conversational Primitive Dashboard (a dedicated UI to display primitives), provide all the associated primitive's actions (Complete, Assign, Comment, Delete, etc), enable all the associated primitive's workflows (e.g. send a message to the channel when a task is completed).

Conversational Primitives

Figure 1:
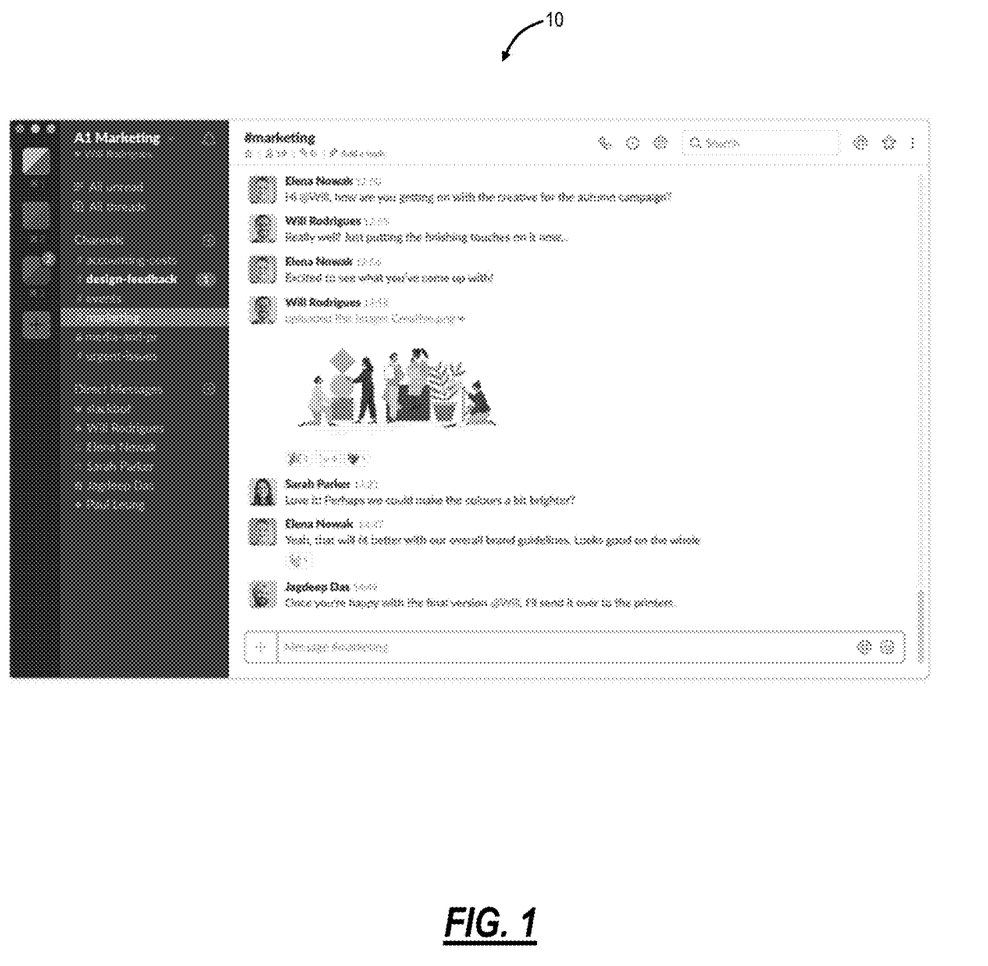
FIG. 1 is a screenshot of a conversational service.

FIG. 1 is a screenshot of a conversational service 10. Here, there are various users (each with a photo or icon and their name) and each user can provide messages. In the conversational service 10, each new message from a respective user is shown at the bottom and each time a new message is added, the previous messages scroll upwards. Further, the left side of the screen includes channels, e.g., #accounting-costs, #design-feedback, #events, #marketing, etc. In this example, the messages are displayed for the #marketing channel. The conversational service 10 can also support direct messages, filtering by unread messages, threads, a search bar, etc. As described herein, these messages are unstructured and any action or tracking of such messages require a user to manually enter the associated data in an associated application.

Interactions happening between users on the conversational service 10 such as messaging, email, voice based applications (systems of engagement) are entered as unstructured data because of the nature of human conversations. As such, they are difficult to track and not actionable, often impacting organizations' productivity. Ultimately such interactions need to be manually structured and transferred in dedicated external system of records where they can be organized, made actionable, and trigger subsequent workflows.

Accordingly, the present disclosure includes analyzing the messages in the conversational service to identify messages that match conversational primitives and to convert them into a structured and actionable form. Examples of conversational primitives include, without limitation, a task; a meeting or event; a question such as a basic question and answer, a poll, or a survey; an answer; a praise; a celebration; an announcement; an important message; a labeled message; a recurring message; an approval request; a review request; a conflict; a feedback; etc. Primitives are abstract objects that have associated A) entities, B) actions, and/or C) workflows.

Figure 2:
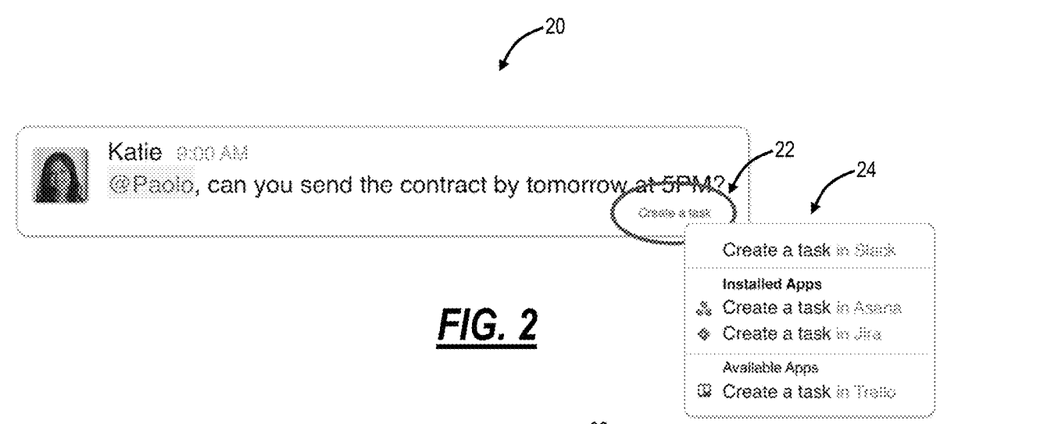
FIG. 2 is a screenshot of an example message in the conversational service of FIG. 1.

FIG. 2 is a screenshot of an example message 20 in the conversational service 10. The example message 20 includes Katie asking Paolo to send the contract by tomorrow at 5 pm. The example message 20 is an example of a task for the conversational primitive. Each conversation primitive can have associated one or more of entities, actions, and/or workflows. An entity represents a critical piece of information in a message and can include a sender of the message, an assignee associated with the message, a subject of the message, timing, location, etc. In this example of a task, the entities include Katie as the sender, Paolo as the assignee, a task name of "send contract," and timing of a due data of tomorrow at 5 PM. The actions for the task of "send contract" include Complete, Edit, Assign, Add File, Comment, Delete, etc. That is, the actions are actionable items that can be tracked, noted, assigned, marked completed, etc. Finally, the workflows for the task of "send contract" include add to an assignee list, add to a send list, set reminders, provide notifications of the actions, etc.

For another example, the simple message "Paolo, can you send the contract by tomorrow at 5 PM" is identified as a primitive (a task) with a due ("by") date ("tomorrow at 5 PM"), to be assigned to Paolo (Assignee); as such, the structured data is then added to Paolo's to-do list (workflow A), it is added to sender "Sent list" (workflow B) for tracking and potential follow up (workflow C), it sets a reminder to be sent to Paolo at 5 PM, if the task is not completed beforehand (workflow D), etc.

For a further example, the message "Great job, Paolo" from Katie is identified as a primitive (praise). Here, there are not necessarily action items but the structured data can include Paolo (Praise Recipient), Katie (Praise Sender) and some metric to track the praise (e.g., a number, etc.); such structured information is then added to the proper section in the Conversational Primitive Dashboard for example in the form of a Leaderboard.

In FIG. 2, the conversational primitive of a task is identified in the message 20 in the conversational service 10 and a hint 22 is presented to "Create a task." Here, the user can select the hint to bring up a menu 24. The menu 24 allows the user to create a task within the conversational service 10 (here, Slack), with installed apps on the associated user device (e.g., Asana, Jira, etc.), or with available apps (e.g., Trello).

A User Interface (UI) element displayed along with the message in the conversational service 10 can give users the hint 22 that the described capabilities can be applied to the message and be triggered. Such hint 22 (a button, a clickable text, etc) can trigger functionalities inside the conversational service 10, trigger the interaction with previously installed third party apps integrated with the conversational service, suggest the installation of yet to be discovered third party apps integrated with the conversational service that other users applied to similar messages or that are registered to be displayed, for free or through paid advertisement, when such primitive is identified.

Figure 3:
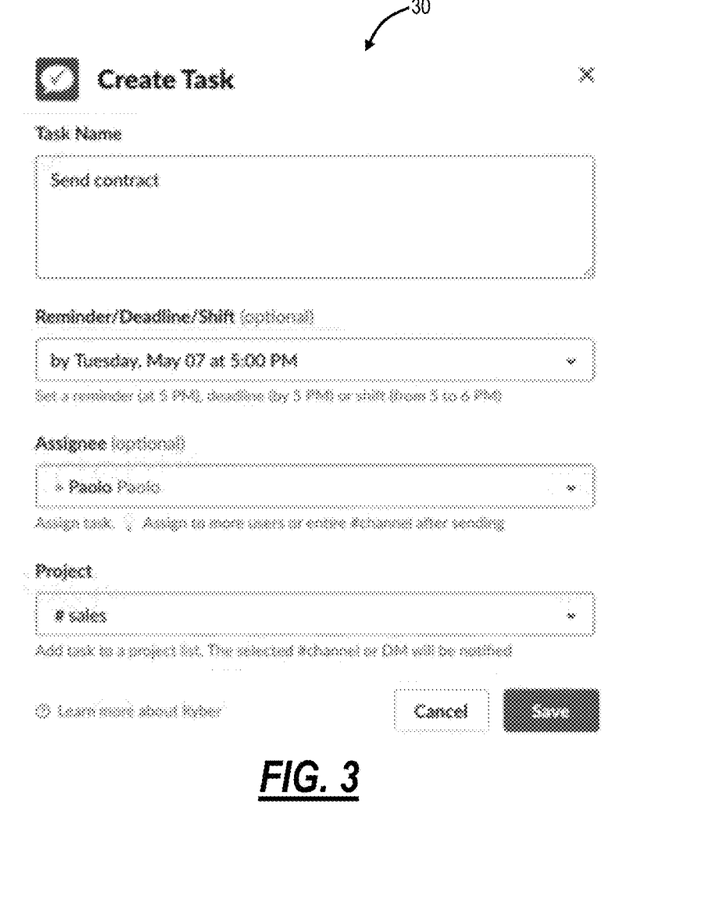
FIG. 3 is a screenshot of a task creation screen.

FIG. 3 is a screenshot of a task creation screen 30. From the example message 20, the user can select the hint 22 to create a task in Slack bringing up the task creation screen 30. Here, the information for creating the task is auto-filled based on the detection of the conversational primitive. For example, the task name is auto-filled, the reminder/deadline is auto-filled, the assignee is auto-filled, the project list is auto-filled with current #channel. Here, a user can simply select "Save" to easily convert the unstructured message 20 into a structured and actionable task, further triggering task-related workflows.

Conversational primitives are repeatedly present in common conversations, especially at work or in any group working for some common purpose, and can be easily identified by training appropriate Natural Language Processing (NLP) text classification models. The training data set can also include actions manually applied to messages by users on the conversational system, such as reactions, actions, etc. The present disclosure contemplates labeling data sets to identify various different conversational primitives. Again, examples of conversational primitives include, without limitation, a task; a meeting or event; a question such as a basic question and answer, a poll, or a survey; an answer; a praise; a celebration; an announcement; an important message; a labeled message a recurring message; an approval request; a review request; a conflict; a feedback; etc.

Of note, the present disclosure includes more than just meetings or tasks. Rather, the labeling is for a variety of different primitives. Further, some of the primitives may not have follow-up actions, but simply represent some important event has occurred. For example, a praise or celebration simply reflect someone has done something positive. Again, primitives are abstract objects that have associated A) entities, B) actions, and/or C) workflows. The follow-up actions for a praise or celebration may simply be to track the positive news to surface them from the free flow of messages. That is, a follow-up action does not necessarily require any action that is applied to the now structured message. In this case of a praise or celebration, there are no actions, but there is the workflow of adding the message to the Conversational Primitive Dashboard under the praise section.

Once messages matching primitives are identified and extracted from the free flow of messages, they can be then further analyzed to extract entities such as Sender/Recipient (s), description, start date/time, end date/time, reminder date/time, due date/time, recurrence, location, documents, files, web links to online content, options, emoji, etc.

Using the combination of primitive identification and entity extraction, the selected messages can be decomposed and structured to better track and organize conversational information into a system of record. Such system of record can be native to the conversational systems, e.g., a structured, organized and actionable list of the identified messages, accessible by each user inside the conversational systems through the standard messaging interface or one or more dedicated areas (e.g., a Conversational Primitive Dashboard), or external apps such as to-do list, project management, calendars, Human Resource (HR) tools for Paid Time Off (PTO) approvals or team surveys or employee performance, etc. Such external apps can optionally be synchronized with the native system as described herein under Primitive-based Platform below (where messages can be created solely for the purpose of injecting a conversational primitive). This approach can also simplify third party app integrations inside the conversational service 10.

The process of converting a message into structured item can be either manual (i.e., user clicks on the hint to start accessing the functionality) or automated. The automated process can be via basic configuration (e.g., every time a message with a task is identified, create the task), via advanced configuration based on Conversational Workflow Automation described herein (e.g., every time a message matching the task primitive and containing the keyword "laptop" is identified, create the task, send it to a group of recipients and assign it to one of them), or based on the design of apps leveraging the Primitive Events APIs described below. This approach can help the conversational service to surface internal advanced functionalities, help discover third party apps providing similar functionalities, help adoption and usage of such functionalities once apps are discovered and installed.

The simple message is now turned into a structured item that could be either added to an actionable and structured list native to the conversational service 10 (the Conversational Primitive Dashboard) and/or synchronized to an external third party tool; the native tool and the external one might or might not be further directly synchronized; if synchronized, users would be able to interact with the structured item from either the native tool or the external one, keeping the two systems fully synchronized.

Figure 4:
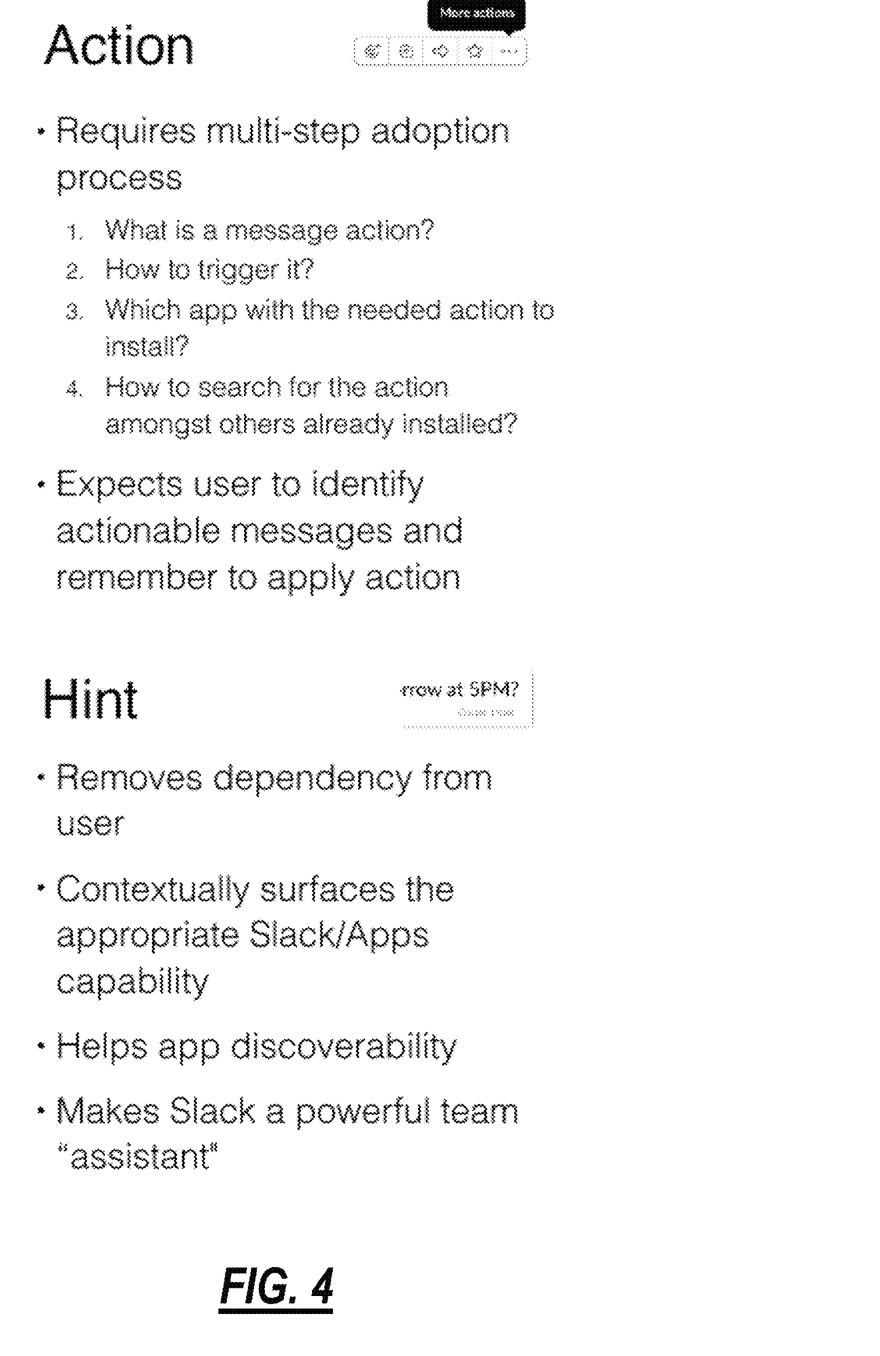
FIG. 4 is a diagram of the difference between a conventional action and a hint that is displayed upon detection of a conversation primitive in the conversational service of FIG. 1.

FIG. 4 is a diagram of the difference between a conventional action and the hint 22. Conventional apps provide an action button, i.e., "more actions," and this step requires a multi-step adoption process, i.e., what is the message action, how to trigger it, which apps are needed, how to search for the action amongst others, etc. That is, the conventional approach does not help users with the information overload in the conversational service 10. It puts the onus on the user and provides no way to automate, track, etc. The hint 22 removes the dependency from the user. The process itself suggests the appropriate action, app, etc.

Actionable Conversational Primitive Dashboard

Figure 5:
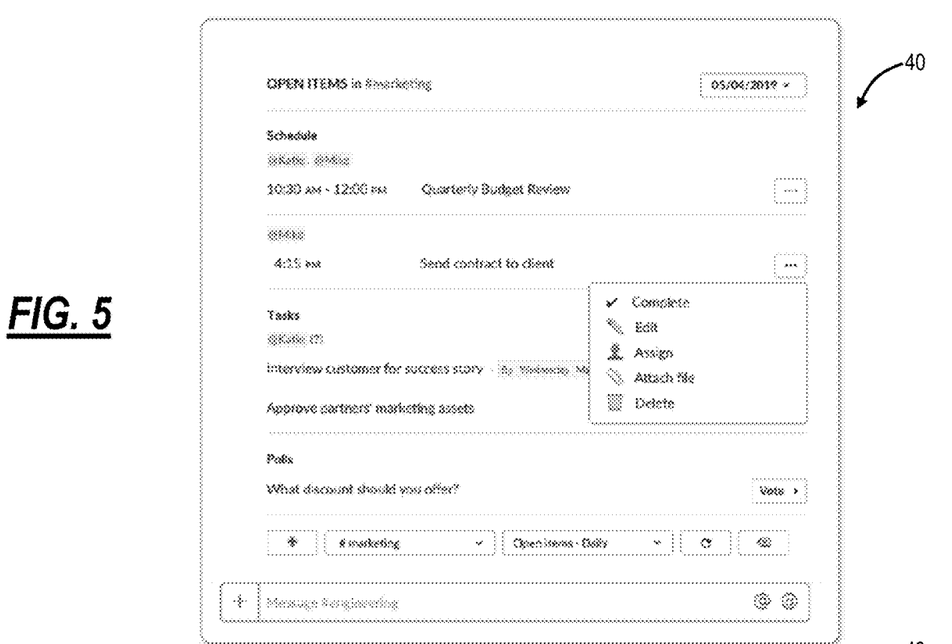
FIG. 5 is a screenshot of open items in a #marketing channel.
Figure 6:
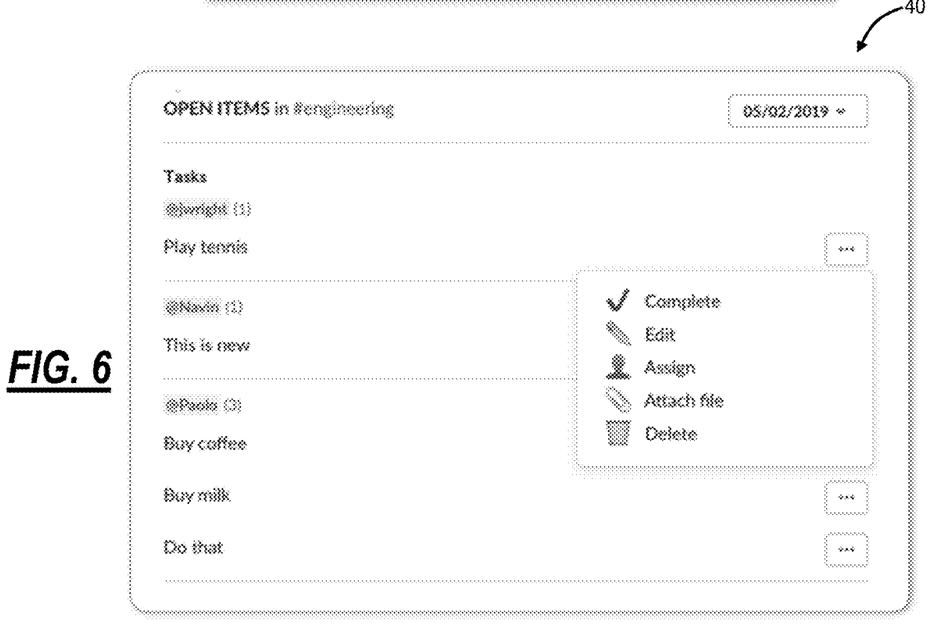
FIG. 6 is a screenshot of open items in an #engineering channel.

Again, the flow of messages in the conversational service 10 is unstructured and each user is responsible for processing the messages and manually maintaining their own lists. In an example aspect, the present disclosure identifies conversational primitives, organizes them in a structured and actionable form, further triggering automated workflows. As such, the free flow of messages can have an associated Conversational Primitive Dashboard 40. FIG. 5 is a screenshot of open items in a #marketing channel, and FIG. 6 is a screenshot of open items in an #engineering channel. Each of these open items is based on messages identified as conversational primitives that have been converted into structured items or imported from external applications leveraging the Primitive oriented APIs. Here, the information overload from the conversational service 10 is reduced to actionable lists of primitives. There can be various groupings of the items (by primitive, by date, by project, by user, etc). Further, there can be a contextual summary to reduce information overload and boost productivity. For example, there can be shared lists per channel, personalized lists across channels, etc.

Conventionally, there are Natural Language Processing techniques that are useful in categorizing messages such as to identify a task, a meeting, etc. These approaches simply categorize messages and offer no intelligence to summarize, structure, etc. The present disclosure includes both the aspect of categorization as well as adding structure to that identified messages matching conversational primitives can be maintained, summarized, tracked, etc., such as in the dashboard 40.

In an embodiment, the present disclosure is useful in summarizing conversations. For example, assume one is out of vacation and their inbox has over 500 messages. Instead of reading 500 messages, the person could view the highlights summarized in their structured form in the dashboard 40. Further, the dashboard 40 offers tracking where progress can be seen, as well as an ability to drill-down and view the original messages that triggered any particular item in the dashboard 40.

Intelligent, Trackable, and Actionable Conversational Process

Figure 7:
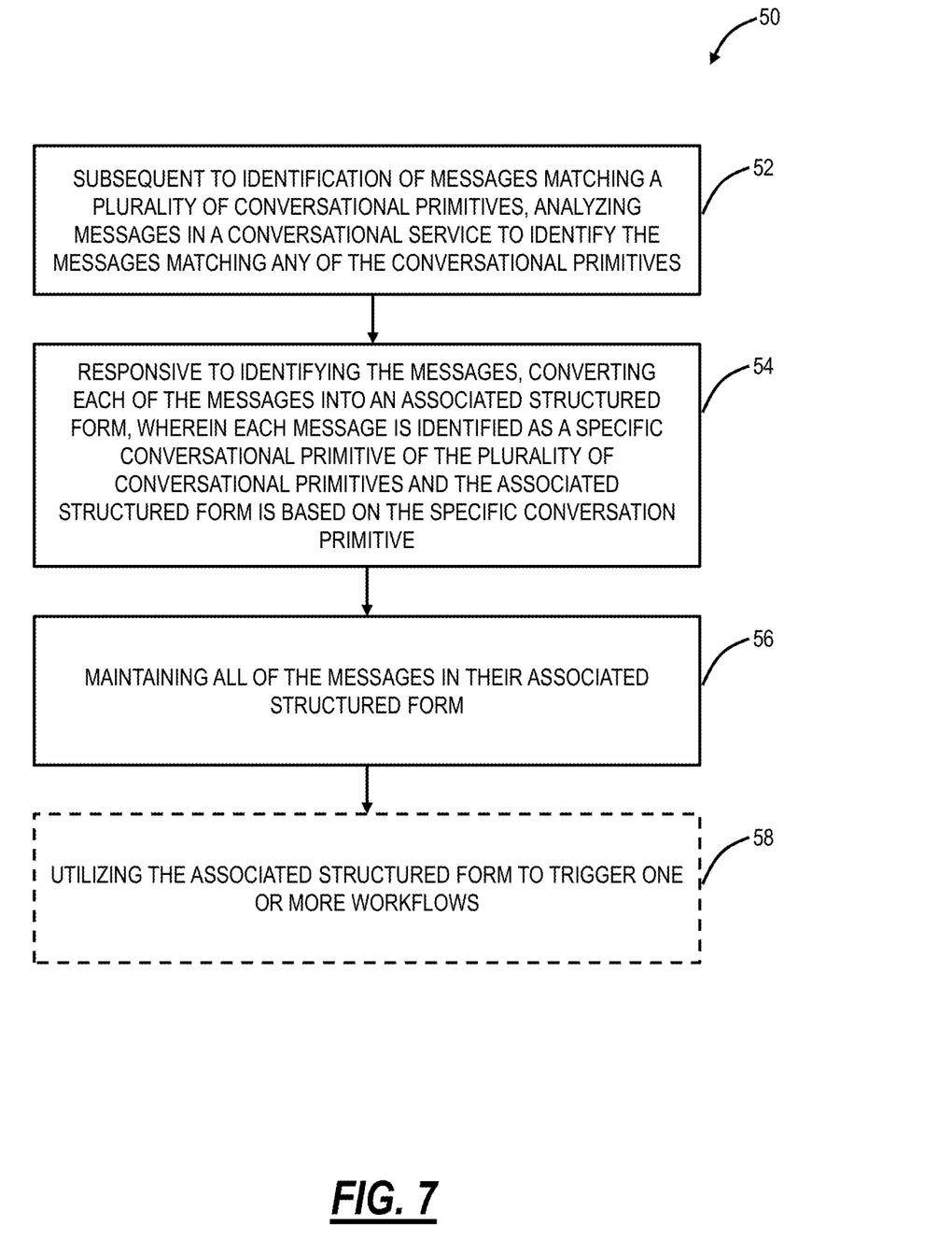
FIG. 7 is a flowchart of an intelligent, trackable, and actionable conversational process 50

FIG. 7 is a flowchart of an intelligent, trackable, and actionable conversational process 50. The process 50 includes, subsequent to identification of messages matching a plurality of conversational primitives, analyzing messages in a conversational service to identify the messages matching any of the conversational primitives (step 52); responsive to identifying the messages, converting each of the messages into an associated structured form, wherein each message is identified as a specific conversational primitive of the plurality of conversational primitives and the associated structured form is based on the specific conversation primitive (step 54); and maintaining all of the messages in their associated structured form (step 56). The process 50 can further include utilizing the associated structured form to trigger one or more workflows (step 58). The associated structured form is utilized for follow-up actions, workflows, etc.

The training can include labeling data for each of the plurality of conversational primitives to train a Natural Language Processing model for the analyzing. The process 50 can further include providing a dashboard that includes all of the messages for management of action items and summary of associated conversations; and providing associated messages responsive to selections in the dashboard. The process 50 can further include providing a hint to a user responsive to identifying a conversational primitive; and converting the identified message to the associated structured form based on the user selecting the hint. The hint can include a plurality of options to generate the associated structured form in a plurality of applications including the conversational service.

Each conversational primitive can include any of a task, a meeting or event, a question, a poll, a survey, an answer, a praise, a celebration, an announcement, an important message, a labeled message, a recurring message, an approval request, a review request, a conflict, and a feedback. At least one of the plurality of conversational primitives can have no associated action and is used to track an event in the messages. For example, conventional approaches can include Natural Language Processing to identify tasks or meetings. The process 50 can identify far more activity including non-action oriented primitives. For example, at least one of the plurality of conversational primitives can be used to track an event in the messages, and wherein the event can be utilized for tracking user performance. Here, the conversational primitive may include a praise, kudos, announcement, etc. and the structured form may include name and points or some other metric for tracking. For example, this type of conversational primitive may be used for Human Resources (HR) or the like for tracking performance.

The process 50 can include importing, from an external application and via an Application Programming Interface, a structured form created to match one of the plurality of conversational primitives, wherein the structured form is utilized to add to the maintaining. The process 50 can include providing, to an external application and via an Application Programming Interface, a notification responsive to identifying the messages.

Primitive-Based Platform

Today, conversational services offer low level APIs allowing developers to create, receive and manage only basic message objects, requiring them to add associated custom actions and build workflows from scratch. A Primitive-based Platform offers Primitive-oriented APIs and Primitive Events APIs. A Primitive-based Platform allows developers to easily create primitive objects with associated Actions and Workflows, synchronize the data in their existing external services with the Conversational Primitive Dashboard and be notified via Primitive Events API when primitives are identified in the stream of messages sent on the conversational service.

A Primitive-oriented API can be used to create the high level objects (e.g., task) associated with a conversational primitive. By using that object oriented API instead of the low level one, developers simply need to program the right entity fields (e.g. sender, assignee, task name, due date, etc), customize the primitive Actions (Complete, Assign, Reassign, Edit, Delete, etc), configure the workflows (if and where to send the task notifications, etc). The resulting object can be added to the Conversational Primitive Dashboard.

Primitive Events APIs can notify a third party app that a message representing a primitive was sent. Developers can subscribe to Primitive Events APIs, to be alerted when certain types of messages are sent on the conversational service. For example, a knowledge management app could subscribe to be notified when a question is asked on the conversational service and offer to respond if it already has the answer stored; if not, they can listen to next messages and ask to store it for future use. Developers can then use the information retrieved via the Primitive Events APIs to create the object on the conversational service with any of the Primitive-oriented APIs and/or on their own external services.

Current APIs provided by the conversational service are very low level, requiring developers to build from the ground up their user experiences, which include custom UIs, UX and associated workflows. For these reasons, current integrations of external applications with the conversational service are often limited to basic notifications of activities inside the external applications. By identifying structured message primitives, i.e., type of messages that represent a structured information such as a task, a poll, a survey, an event, etc., a higher level, primitive-oriented API is presented to developers that can be invoked to easily integrate with their existing product residing outside the conversational system (e.g., desktop, web, mobile) and immediately offer a complete application native to the conversational service 10 via the Conversational Primitive Dashboard.

For example, assume a task is created in a project management app, the task can be created inside the conversational service 10 via primitive-oriented API: entities are populated, Actions are customized, workflows are configured and triggered. The task is now added with the appropriate, customized Actions to the Conversational Primitive Dashboard inside the conversational app, workflows are further triggered.

In other words, a project management application interested in developing a companion application on a conversational service could simply call a Task-oriented API when a task is created on their original application (e.g., on Desktop). From there, a sequence of actions would be triggered by the Primitive-based Platform on the conversational service, e.g., send a message to a channel announcing the task creation, add the task to the associated list as described in Actionable Conversational Primitive Dashboard (a dedicated UI to display primitives), provide all the associated, customized primitive's actions (Complete, Assign, Comment, Delete, etc), enable all the associated, configured primitive's workflows (e.g. send a message to the channel when a task is completed).

Therefore, instead of rebuilding each time the same UI, UX, notifications and workflows, developers could simply integrate their product with higher level, partially configurable primitive objects. Developers are able to configure, for example, which action to display (e.g. Complete, but not Add a File), customizing its label to match they original product language convention (e.g. "Complete" rather than "Done"), which and where notifications will be sent (e.g. notification for Task Completion to the channel, for Editing to the sender or recipient only), where the results of workflows will be sent (e.g. privately to each user or publicly to a group of users) as described herein. This configurable approach still allows developers to customize their experience matching their existing and differentiate their offering from others using similar approach.

From a user perspective a unified, consistent UI/UX improves usability and speed up adoption of different services inside the conversational platform.

Conversational Workflow Automation

In another embodiment, the present disclosure relates to conversational workflow automation systems and methods. As described herein, workflow automation is a technique to take an output of application A and generate an action in application B. The present disclosure enables workflow automation through parsing and understanding of messages generated by an application or a human user (generically described below as "application A") via a conversational service enabled on a conversational platform that provides messaging, email, voice, etc. In other words, the content, context, and meaning (including the identification of a conversational primitive as described above) of a message sent by an app or human user into a conversational platform will trigger an action executed by an app (which could be the same of the triggering app).

Advantageously, the present disclosure removes the need for complex third-party integration via APIs in either of the apps A, B. All that is required is some mechanism for the Conversational Workflow Automation service to access messages from the app A.

Figure 8:
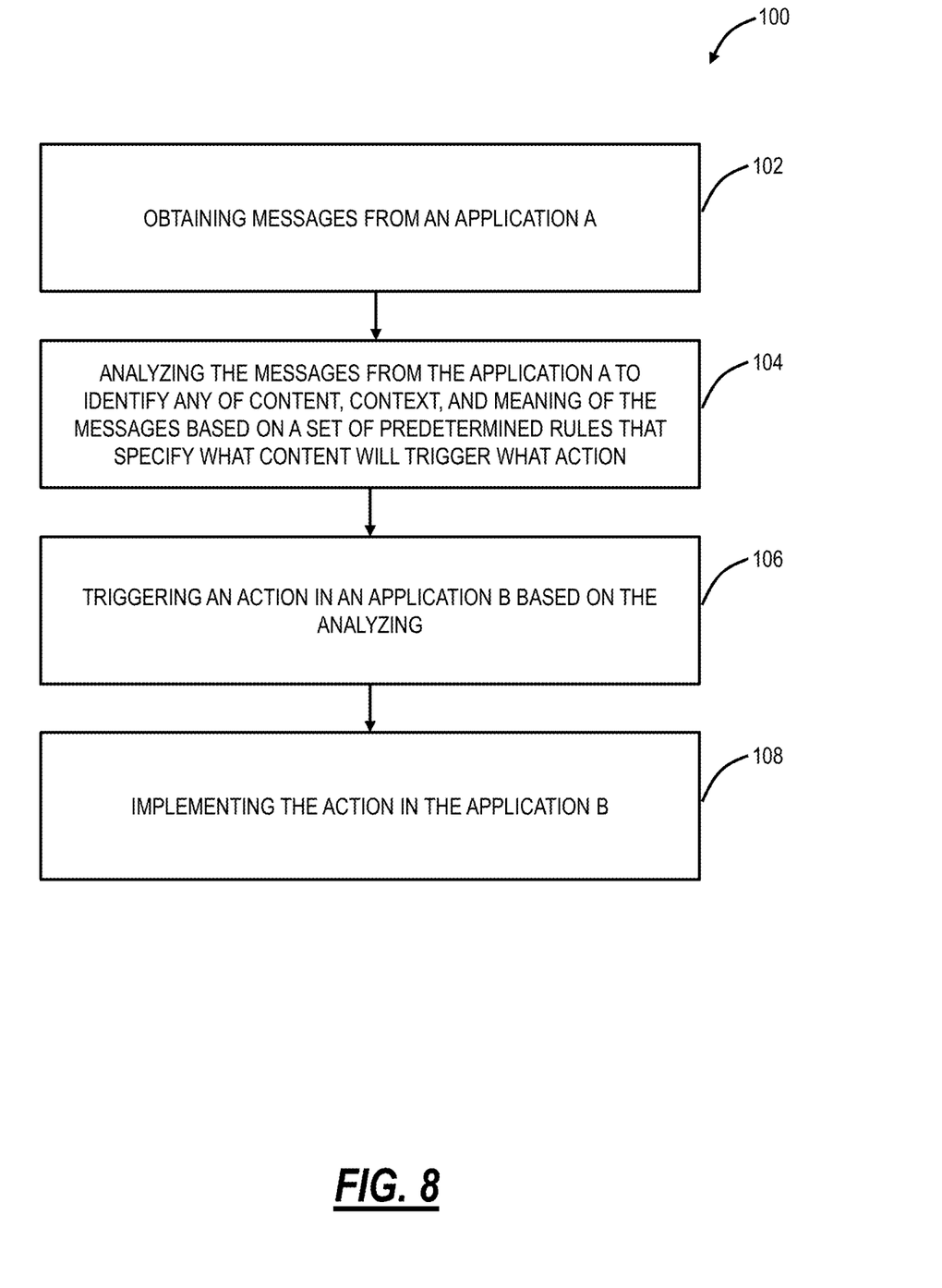
FIG. 8 is a flowchart of a process for workflow automation, implemented by a computer, user device, etc.

FIG. 8 is a flowchart of a process 100, implemented by a computer, user device, etc. The process 100 includes obtaining messages from an application A (step 102); analyzing the messages from the application A to identify any of content, context, and meaning of the message based on a set of predetermined rules that specify what messages will trigger what action (step 104); triggering an action in an application B based on the analyzing (step 106); and implementing the action in the application B (step 108). The applications A and B are separate applications with no Application Programming Interface between the application A and the application B.

Again, workflow automation is commonly described as a way to take the output of application A and cause an action in application B. The Conversational Workflow Automation process 100 enables workflow automation through parsing and understanding of messages and their metadata such as attachments, timestamps, senders, receivers, channels, etc. generated by a computer application or a human via a service enabled on the conversational service. In other words, the content, context, and meaning of a message sent by an app or human into a messaging platform will trigger an action executed by an app (which could be the same of the triggering app). This is performed to remove the need for integrations of Application A and B into a dedicated, separate workflow automation service via APIs.

The Conversational Workflow Automation process 100 can be implemented on a user device that executes the application A and the application B and a Conversational Workflow Automation application implementing the obtaining, the analyzing, and the triggering. The Conversational Workflow Automation application can communicate with a conversation service for implementing the analyzing. The Conversational Workflow Automation process 100 can be implemented on multiple user devices including a first user device that executes the application A and a Conversational Workflow Automation application implementing the obtaining, the analyzing, and the triggering and a second user device that executes the application B.

The set of predetermined rules can be based on human conversations where the application A is a messaging application. The content, context, and meaning of the messages can further include metadata, reactions, a channel where the message is sent. The analyzing can further include advanced language processing that includes emotion and sentiment analysis, tokenization, classification, and information extraction.

Parameters of the triggering message that will be analyzed to execute an action could be keywords or a combination of them, metadata such as timestamp, the channel where the message was sent, edited status, etc. or basic and advanced language processing like emotion and sentiment analysis, tokenization, classification, information extraction, etc. A system is offered to setup rules to trigger actions based on the content, context, and meaning of a message. Workflows triggered by application A can be either provided by same application A, or by any application already integrated with the conversational service as long as the service offers a way to automatically trigger application commands.

The application A can be an application integrated with the conversational service or a human, and the application B can be a i) a module inside the conversational system, ii) another app integrated inside the conversational system, or iii) another app external to the conversational system. For example, a message notification about a support case being closed is sent into the conversational system by application A; based on the content of the message (e.g., the presence of the keyword "completed" or a strikeout format of text or specific characters (e.g., emoji) or symbols, Application B can be triggered to run a survey to rate the service. Another example could be a message from calendar app about a recurring meeting with the title "All hands" triggering a workflow to collect questions to be asked before the meeting and a survey at the end of it.

For example, assume there is a platform P (such as Slack) on which Application A, Application B and Application C are built via platform P APIs. Application A sends a message on platform P. Application B accesses such message, analyzes it and based on set rules triggers an action via Application C on platform P and/or external cloud software associated with Application C. Applications A, B, and C could be separate applications or modules inside one application or the platform P itself (e.g., Application B can be a module inside Application C).

In summary, this is the flow: a user sets up the workflow automation by selecting a bot (representing the Application) or a human user as triggering source (Application A); specifying what content, context, meaning in any message from the selected bot/user will trigger an action; and picking the action to be executed by application B. The application or user from selected source sends a message, the message contains the specified trigger, and the action is automatically executed.

This approach presents several advantages compared to current workflow automation solutions, especially when used in group/workspace messaging apps where multiple users need to access the same automation, as current solutions require each individual user to create an account into the separated workflow automation service and manually link all the applications to be connected.

For developers, there is no need to further integrate with workflow automation services or to offer integration APIs to create triggers and start workflows and integrations with other apps, as long as their app already sends notification messages in a conversational service. Further, there is no need to define and implement triggers for their app, as users will directly decide based on the content, context, and meaning of the message which action to trigger.

For users, there is no need to create individual accounts with the workflow automation provider for each user attempting to connect apps. There is no need to login into each individual app they want to connect, for each user in the workspace; once the apps sending messages are installed in the messaging platform, every user will directly have access to those messages (individual logins are still necessary for apps offering user-specific information, e.g., calendars) and trigger actions as a consequence. The present disclosure provides a simplified trigger-action generation based on human based, conversational rules and not complex computer logic. Further, the present disclosure provides dynamic workflow automation based on the content of a message versus. simply static event-driven triggers.

Example Server Architecture

Figure 9:
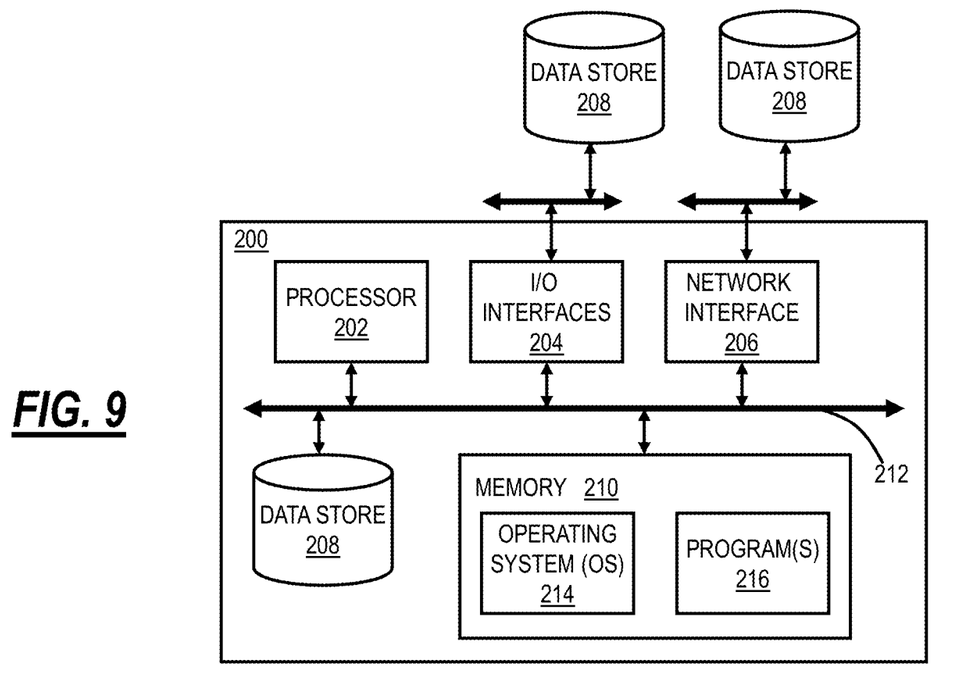
FIG. 9 is a block diagram of a server which may be used to provide cloud services, such as a conversation service.

FIG. 9 is a block diagram of a server 200 which may be used to provide cloud services, such as a conversation service. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 9 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 404. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 10:
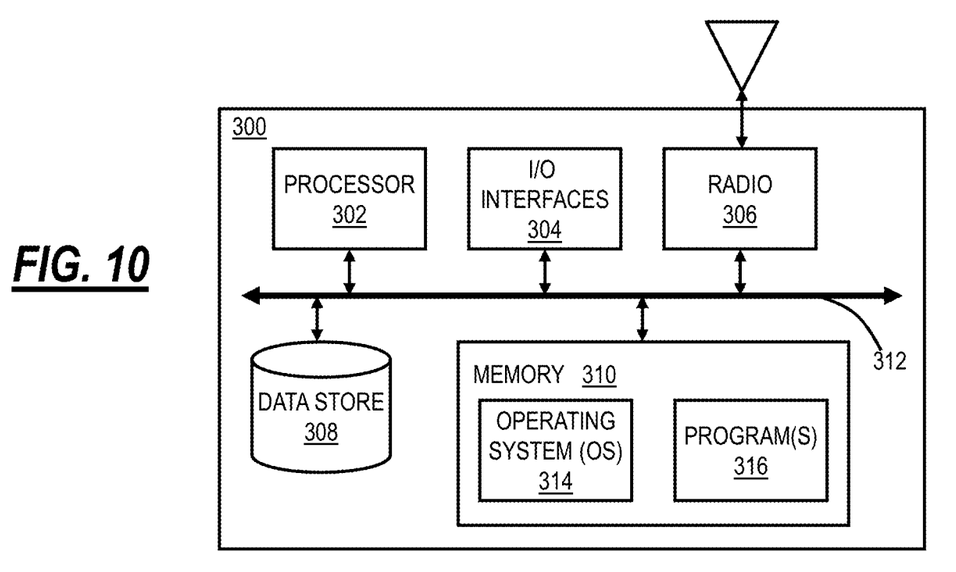
FIG. 10 is a block diagram of a user device which may implement the conversation messaging process.

FIG. 10 is a block diagram of a user device 300 which may implement the conversation messaging process 100. Again, the user device 300 can be a smartphone, a tablet, a smartwatch, an Internet of Things (IoT) device, a laptop, etc. The user device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 10 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chip set), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the user device 300. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (0/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like.

System and User Device

Figure 11:
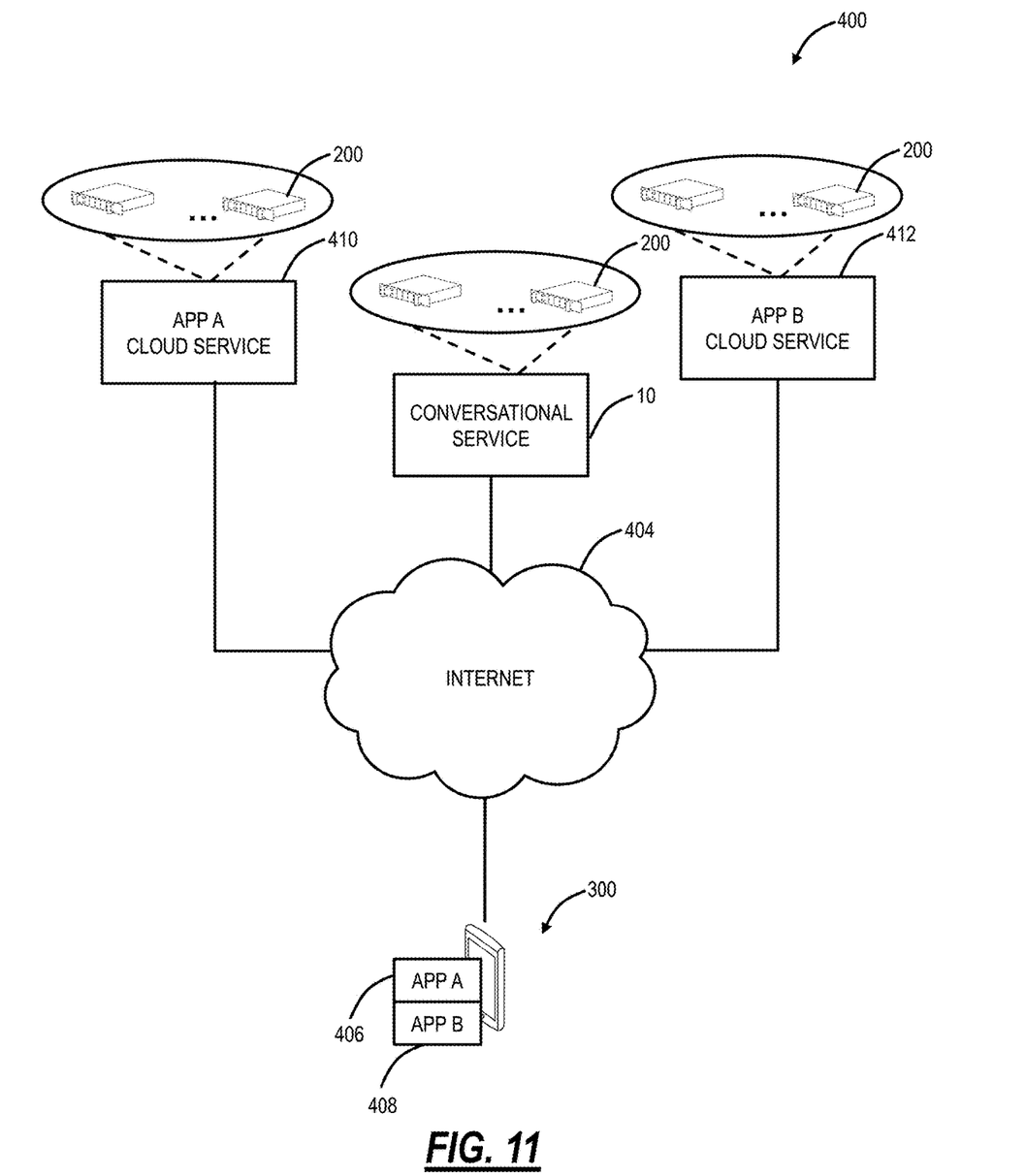
FIG. 11 is a network diagram of a system including a conversational service implemented by one or more servers and communicatively coupled to a user device via the Internet.

FIG. 11 is a network diagram of a system 400 including the conversational service 10 implemented by one or more servers 200 and communicatively coupled to a user device 300 via the Internet 404. The user device 300 can connect to the Internet 404 via a combination of Local Area Networks (LANs), Virtual LANs (VLANs), wireless networks (WLANs, wireless service providers), wired networks (cable, fiber optic, DSL, etc.), enterprise and corporate networks, and the like. The user device 300 can include, without limitation, a smartphone, a tablet, a netbook, an ultrabook, a laptop, a desktop, a personal digital assistant, and the like.

The user device 300 can execute applications A, B 406, 408. In an embodiment, the applications A, B 406, 408 can operate associated cloud services 410, 412. In another embodiment, the applications A, B 406, 408 can operate entirely local to the user device 300. In a further embodiment, one of the applications A, B 406, 408 can operate entirely local to the user device 300 while the other of the applications A, B 406, 408 can operate with its respective cloud service 410, 412.

Figure 12:
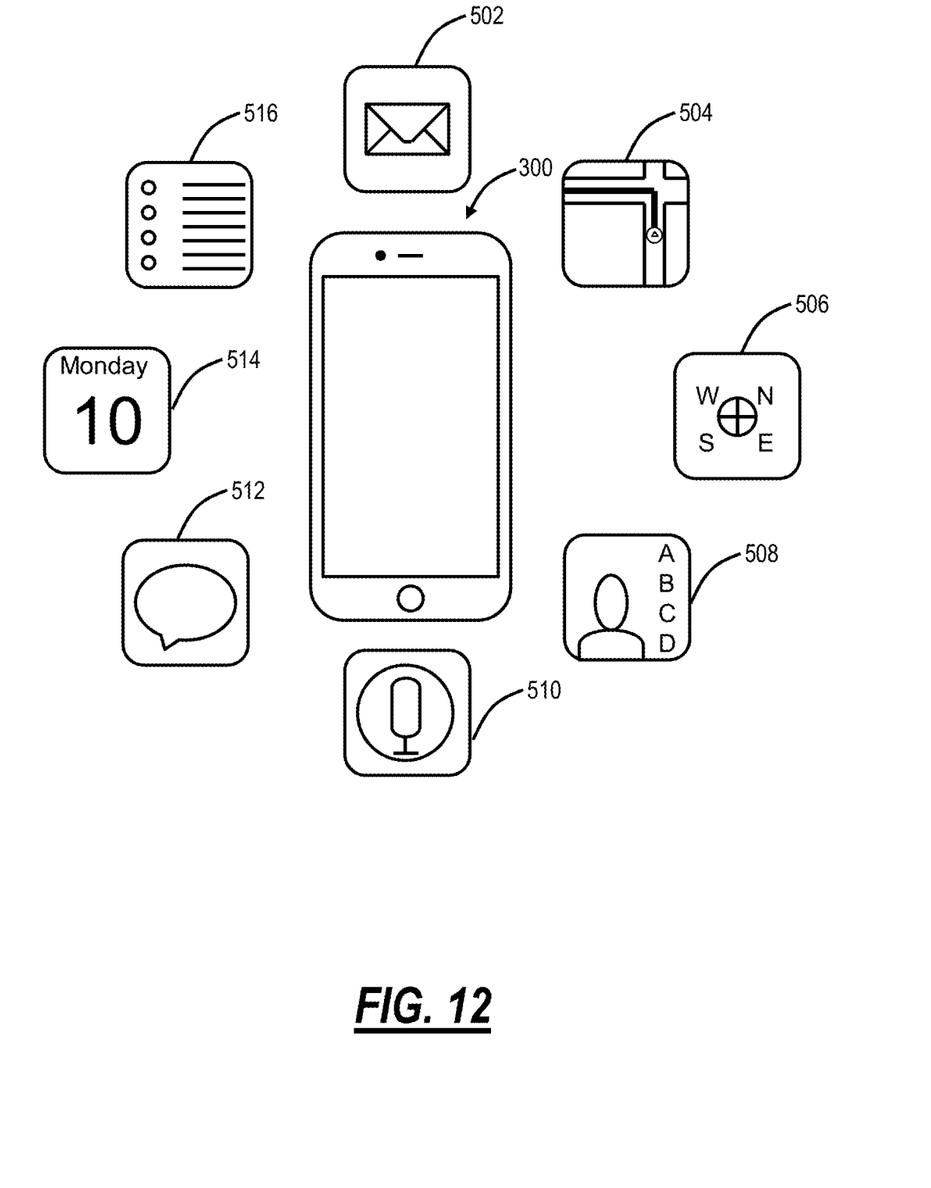
FIG. 12 is a diagram of a mobile device and associated applications.

FIG. 12 is a diagram of a user device 300 and associated applications 502-516. FIG. 12 illustrates some example applications, including mail 502, a map application 504, a compass 506, an address book 508, a microphone 510, a messaging application 512, a calendar 514, and a reminder list 516. Of course, those of ordinary skill in the art will recognize that the user device 300 can include various other applications or "apps." Generally speaking, these applications 502-516 are used for productivity, collaboration, etc. Of course, there are other categories of apps available for the user device 300 as well. In an aspect of the conversational systems and methods, the messaging application 512 is integrated with the other applications 502-510, 514-516 via the process 100. The mail 502 is an app for electronic mail. The map application 504 utilizes a location determination device associated with the mobile device 300 to provide maps, directions, etc. The compass 506 provides direction. The address book 508 keeps track of other users and their associated contact information. The microphone 510 provide audio input to the mobile device 300. The messaging application 512 is used for communication with other users. The calendar 514 keeps appointments for the user. Finally, the reminder list 516 is a task or to-do list for the user.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a processor to perform the steps of:
   subsequent to identification of messages matching any of a plurality of conversational primitives, analyzing a plurality of messages in a conversational service to identify the messages, of the plurality of messages, matching any of the conversational primitives;
   displaying a hint, to a user responsive to identifying the messages matching any of the conversational primitives, with each of the messages matching any of the conversational primitives, the hint including one of a selectable button and selectable text configured to bring up a menu that allows the user to select an action, based on text of an associated message matching one or more of the conversational primitives, to be triggered;
   autogenerating structured data for the action based on one or more of the conversational primitives from the message;
   converting each of the messages, identified as matching any of the conversational primitives, into an associated structured form responsive to one of, for each message, identifying the message as matching any of the conversational primitives and the user selecting the hint associated with the message, wherein each of the messages is identified as a specific conversational primitive of the plurality of conversational primitives and the associated structured form is based on the specific conversational primitive;
   maintaining all of the messages, converted into the associated structured form, in their associated structured form;
   importing all of the identified messages in their structured form into a dashboard; and
   in response to receiving a selection of a structured form in the dashboard, providing a message from which the structured form originated.

2. The non-transitory computer-readable storage medium of claim 1, wherein the computer readable code is further configured for programming the processor to perform the steps of
   utilizing the associated structured form to trigger one or more workflows.

3. The non-transitory computer-readable storage medium of claim 1, wherein the identification includes labeling data for each of the plurality of conversational primitives to train a Natural Language Processing model for the analyzing.

4. The non-transitory computer-readable storage medium of claim 1, wherein the hint includes a plurality of options to generate the associated structured form in a plurality of applications including the conversational service.

5. The non-transitory computer-readable storage medium of claim 1, wherein the action is one of a task, a meeting or event, a question, a poll, a survey, an answer, a praise, a celebration, an announcement, an important message, a labeled message, a recurring message, an approval request, a review request, a conflict, and a feedback.

6. The non-transitory computer-readable storage medium of claim 1, wherein at least one of the plurality of conversational primitives has no associated action and is used to track an event in the messages.

7. The non-transitory computer-readable storage medium of claim 1, wherein at least one of the plurality of conversational primitives is used to track an event in the messages, and wherein the event is utilized for tracking.

8. The non-transitory computer-readable storage medium of claim 1, wherein the computer readable code is further configured for programming the processor to perform the steps of
importing, from an external application and via an Application Programming Interface, a structured form created to match one of the plurality of conversational primitives, wherein the structured form is utilized to add to the maintaining.

9. The non-transitory computer-readable storage medium of claim 1, wherein the computer readable code is further configured for programming the processor to perform the steps of
providing, to an external application and via an Application Programming Interface, a notification responsive to identifying the messages.

10. A computer-implemented method comprising:
subsequent to identification of messages matching any of a plurality of conversational primitives, analyzing a plurality of messages in a conversational service to identify the messages of the plurality of messages, matching any of the conversational primitives;
displaying a hint, to a user responsive to identifying the messages matching any of the conversational primitives, with each of the messages matching any of the conversational primitives, the hint including one of a selectable button and selectable text configured to bring up a menu that allows the user to select an action, based on text of an associated message matching one or more of the conversational primitives, to be triggered;
autogenerating structured data for the action based on one or more of the conversational primitives from the message;
converting each of the messages, identified as matching any of the conversational primitives, into an associated structured form responsive to one of, for each message, identifying the message as matching any of the conversational primitives and the user selecting the hint associated with the message, wherein each of the messages is identified as a specific conversational primitive of the plurality of conversational primitives and the associated structured form is based on the specific conversational primitive;
maintaining all of the messages, converted into the associated structured form, in their associated structured form;
importing all of the identified messages in their structured form into a dashboard; and
in response to receiving a selection of a structured form in the dashboard, providing a message from which the structured form originated.

11. The computer-implemented method of claim 10, further comprising:
utilizing the associated structured form to trigger one or more workflows.

12. The computer-implemented method of claim 10, wherein the identification includes labeling data for each of the plurality of conversational primitives to train a Natural Language Processing model for the analyzing.

13. The computer-implemented method of claim 10, further comprising:
importing, from an external application and via an Application Programming Interface, a structured form created to match one of the plurality of conversational primitives, wherein the structured form is utilized to add to the maintaining.

14. The computer-implemented method of claim 10, further comprising:
providing, to an external application and via an Application Programming Interface, a notification responsive to identifying the messages.

15. A server comprising:
a network interface communicatively coupled to a network;
a processor communicatively coupled to the network interface; and
memory storing instructions that, when executed, cause the processor to:
subsequent to identification of messages matching any of a plurality of conversational primitives, analyze a plurality of messages in a conversational service to identify the messages, of the plurality of messages, matching any of the conversational primitives;
display a hint, to a user responsive to identifying the messages matching any of the conversational primitives, with each of the messages matching any of the conversational primitives, the hint including one of a selectable button and selectable text configured to bring up a menu that allows the user to select an action, based on text of an associated message matching one or more of the conversational primitives, to be triggered;
autogenerate structured data for the action based on one or more of the conversational primitives from the message;
convert each of the messages, identified as matching any of the conversational primitives, into an associated structured form responsive to one of, for each message, identifying the message as matching any of the conversational primitives and the user selecting the hint associated with the message, wherein each of the messages is identified as a specific conversational primitive of the plurality of conversational primitives and the associated structured form is based on the specific conversational primitive; and
maintain all of the messages, converted into the associated structured form, in their associated structured form;
import all of the identified messages in their structured form into a dashboard; and
in response to receiving a selection of a structured form in the dashboard, provide a message from which the structured form originated.

16. The server of claim 15, wherein the instructions that, when executed, further cause the processor to
provide, to an external application and via an Application Programming Interface, a notification responsive to identifying the messages.

* * * * *